March 28, 1939.  A. OTTO  2,152,273
CORN PICKER
Filed Jan. 12, 1938   5 Sheets-Sheet 3

Inventor:
August Otto
By Gillson, *illegible* Attys.

March 28, 1939.  A. OTTO  2,152,273

CORN PICKER

Filed Jan. 12, 1938   5 Sheets-Sheet 5

Inventor:
August Otto
By Gillson, &Co.
Attys.

Patented Mar. 28, 1939

2,152,273

UNITED STATES PATENT OFFICE 2,152,273

CORN PICKER

August Otto, Sandwich, Ill.

Application January 12, 1938, Serial No. 184,626

13 Claims. (Cl. 56—18)

The invention relates to power operated corn pickers.

The objects of the invention are to provide a machine of this kind which, while being a unitary dirigible structure, comprises a wheel-supported flexible frame, and having other features of improvement hereinafter pointed out.

The invention is disclosed as embodied in a structure hereinafter described, and illustrated in the accompanying drawings in which Fig. 1 is a plan view of the machine;

Figure 1:
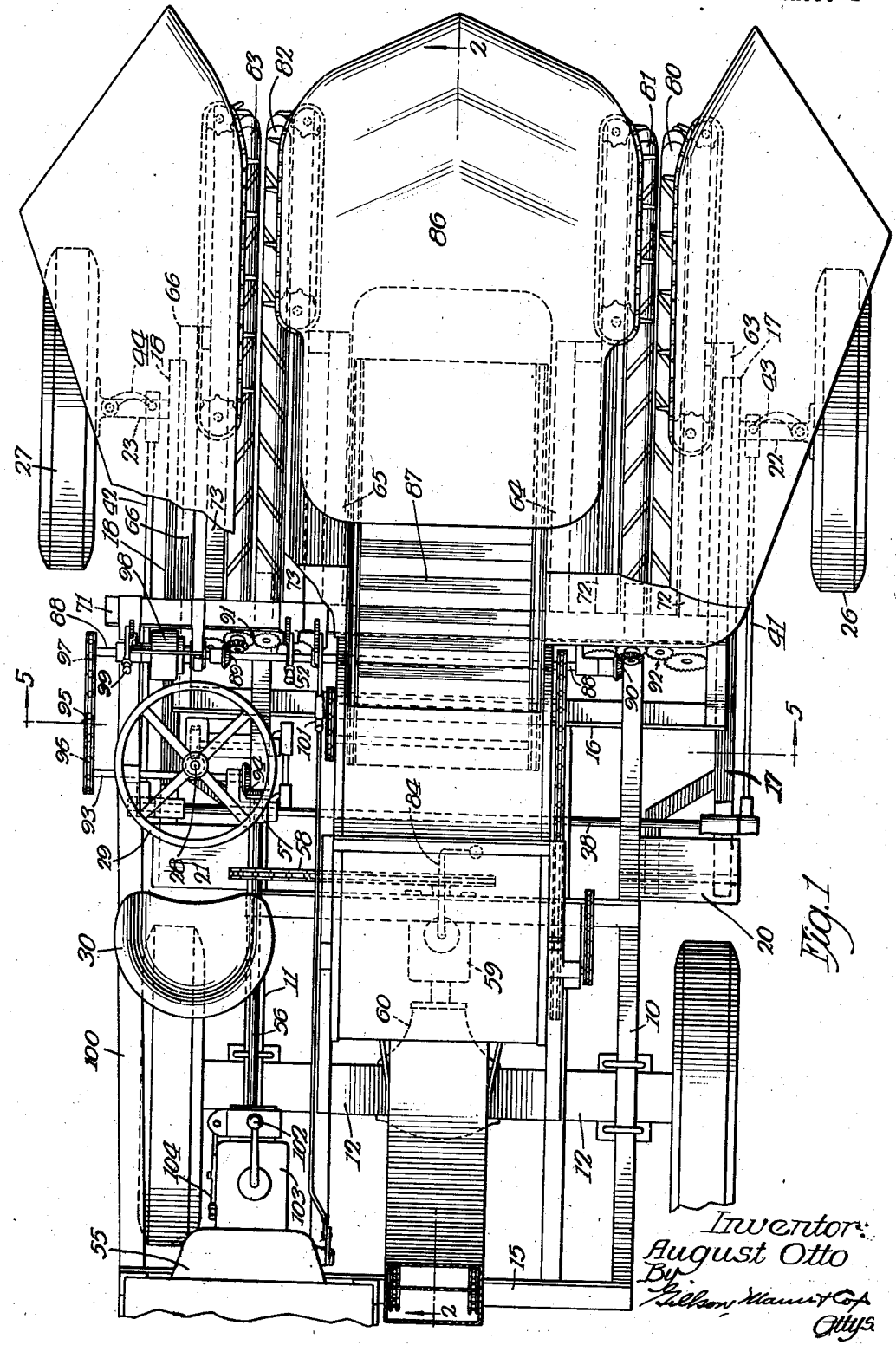

The frame of the machine is sectional, the rear section comprising side beams 10, 11, mounted on the rear axle 12, as shown at 13, 14, and tied together by a rear cross-bar 15 and a forward cross beam 16, shown as formed of a pair of parallel bars. The forward section of the frame comprises a pair of side beams 17, 18, secured together intermediate of their ends by a cross bar 19, which has pivotal attachment to the beams. The rear ends of these beams are pivoted for vertical flexure in or to brackets 20, 21, secured to the beams 10, 11, intermediate of their ends. The forward ends of the beams 17, 18, are rigidly mounted on stub axles 22, 23, to which the steering spindles 24, 25, of the supporting wheels 26, 27, are respectively pivoted for horizontal oscillation.

The downward flexure of the frame is limited, as the forward end of the rear section rests upon the cross bar 19 of the forward section, the rear ends of the side beams of the latter section being supported by the side beams of the rear section. Sufficient torsional play in the frame is, however, permitted to prevent strain due to uneven ground. As the torsional action is centered on and midway of the ends of the cross bar 19, and as this bar is located a substantial distance back of the forward supporting wheels, relative vertical movement of these wheels will not materially affect the height of the front end of the machine.

Suitable steering gear is provided comprising a steering column and hand wheel 28, 29, positioned within reach from the operator's seat 30, the column being journaled in a bracket 31 carried by the beam 11. This column carries at its lower end a gear thread 32, which meshes with a worm gear 33 carried by a short shaft 34, journaled in the bracket 31, and having a crank arm 35, which is connected by a link 36 with a crank arm 37, carried by a rocker shaft 38 journaled in brackets carried by the forward frame beams 17, 18. The shaft 38 has at its ends crank arms 39, 40, which are respectively connected by links 41, 42, with crank arms 43, 44, attached to the spindles 24, 25, of the forward wheels 26, 27. The crank arms 39, 40, are directed respectively downwardly and upward, and consequently as the shaft 38 is rocked the links, and with them the crank arms with which they are respectively connected, are moved in opposite directions.

The described arrangement of the steering gear, mounted in part on the two sections of the jointed frame and controlling the steering wheels of the machine, which are not otherwise tied together, maintains these wheels in parallel relation at all times.

The two sections of the jointed frame are further connected by a bracket 45, carried by the cross beam 16 (shown as a pair of parallel bars) of the rearward section, the bracket slidingly engaging an upstanding pin 46 pivotally mounted on the cross member 19 of the forward section.

Figure 2:
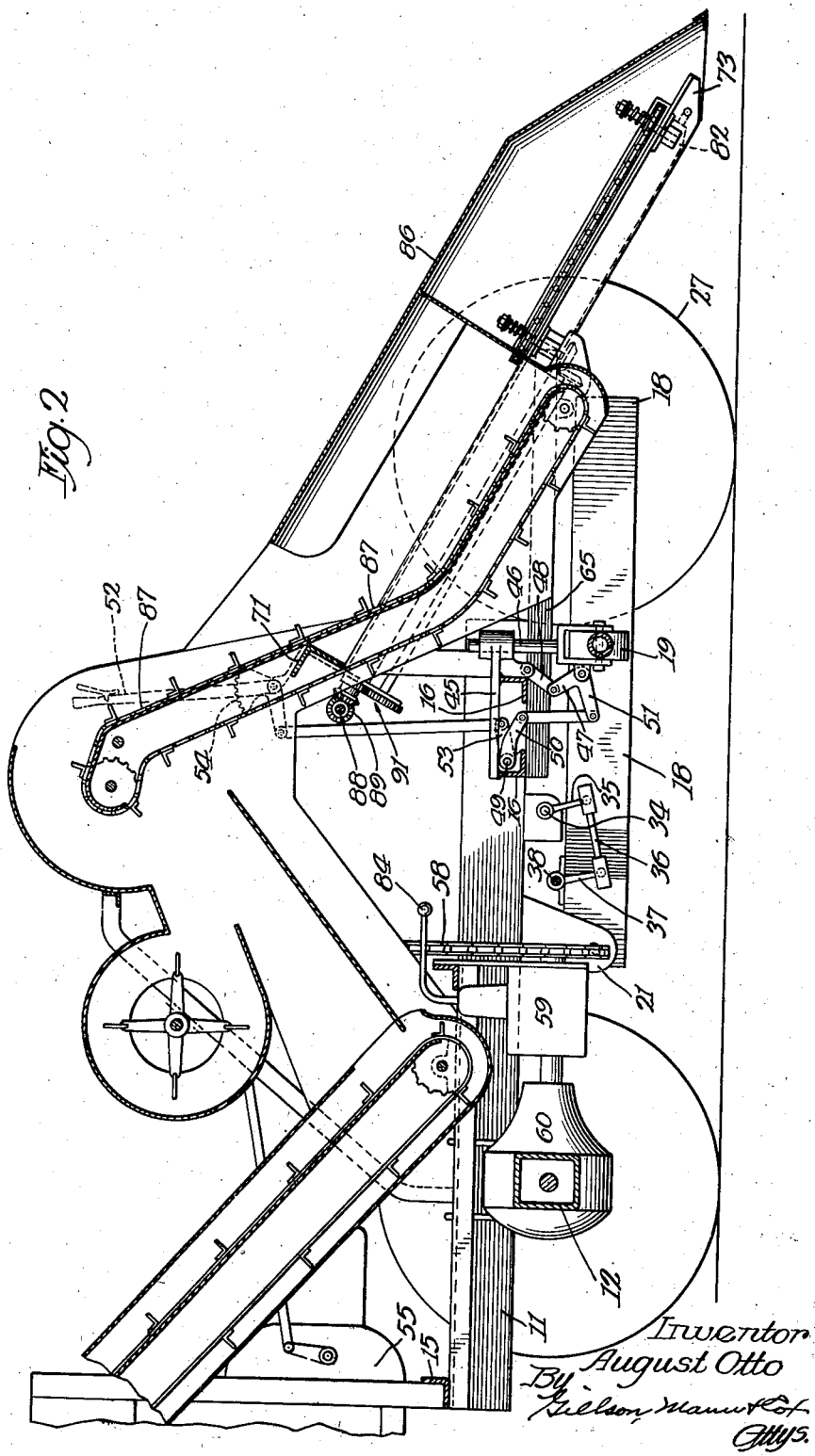
Fig. 2 is a longitudinal vertical section on the line 2—2 of Fig. 1.
Figure 3:
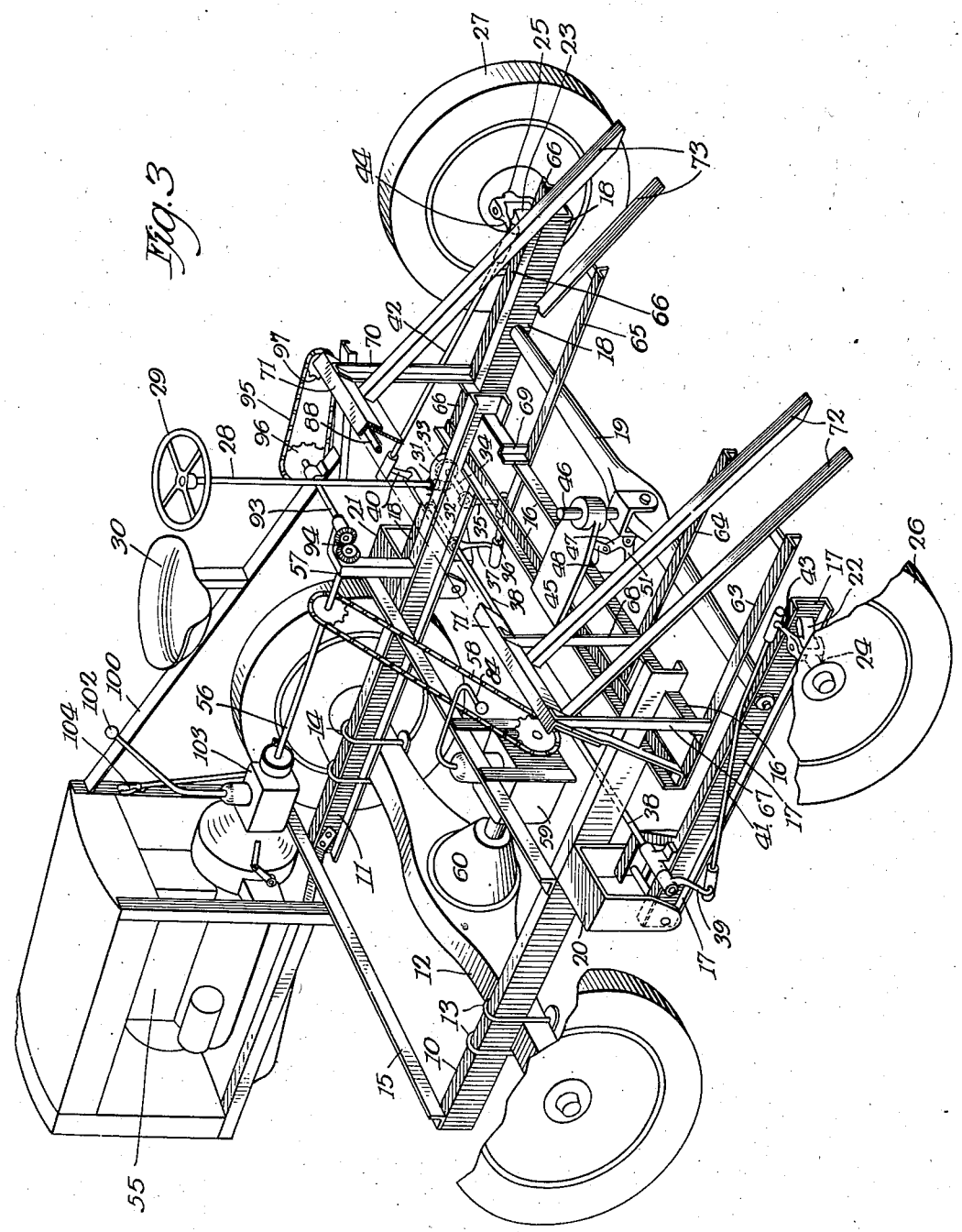
Fig. 3 is a detail plan in perspective, viewed from the right of the machine, with the picker mechanism removed.
Figure 4:
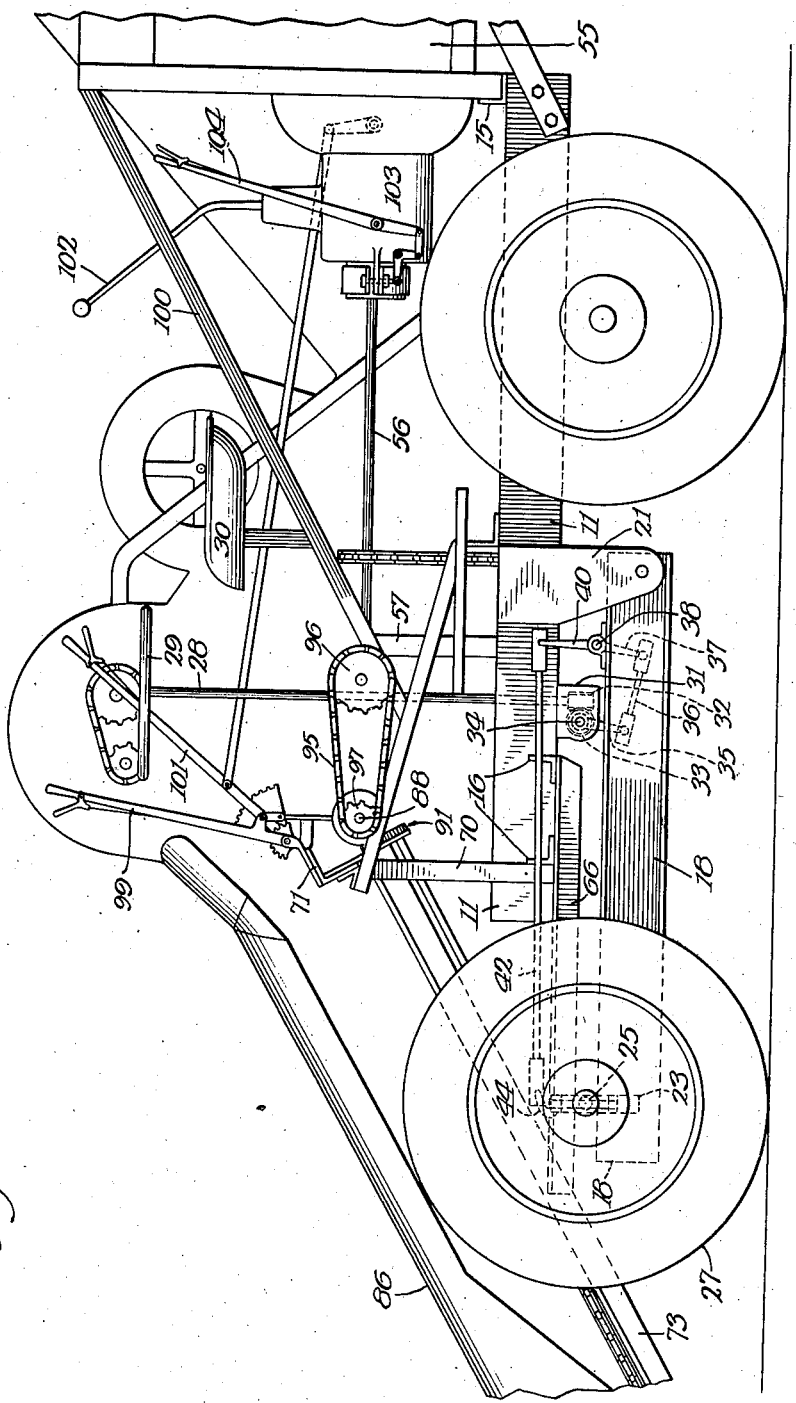
Fig. 4 is a detail side elevation of the supporting and operating mechanism, the view being from the left side of the machine.
Figure 5:
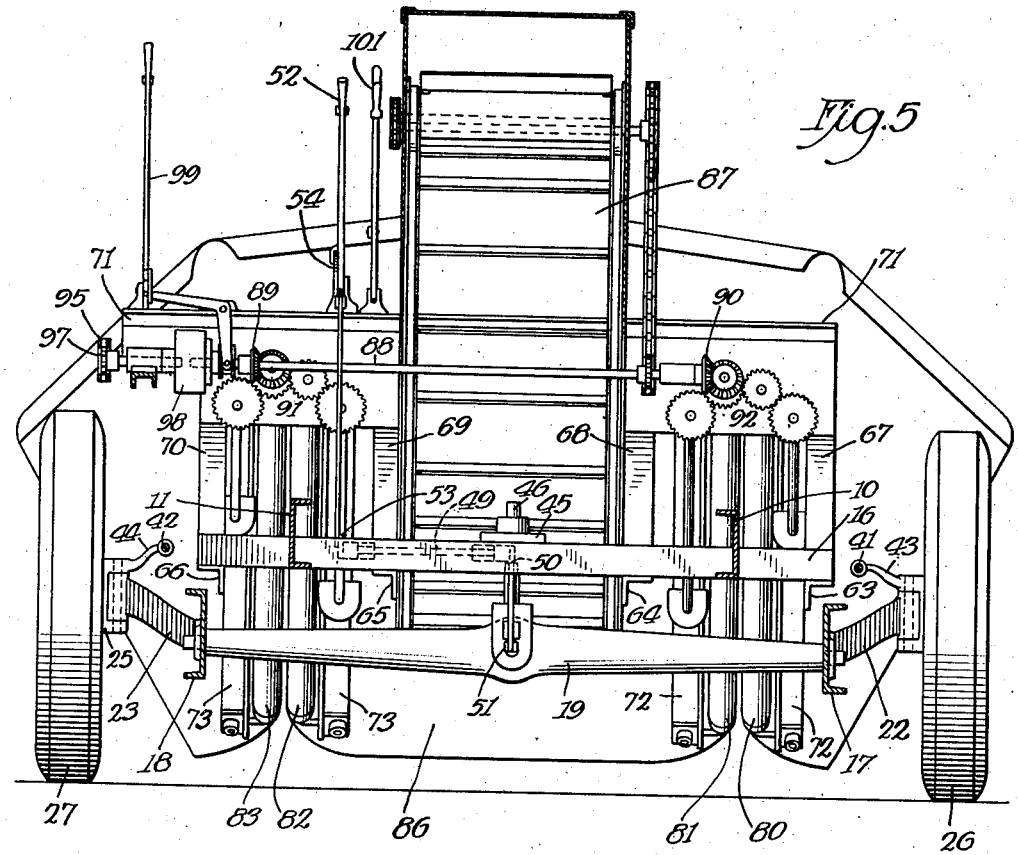
Fig. 5 is a transverse section on the line 5—5 of Fig. 1.
Figure 6:
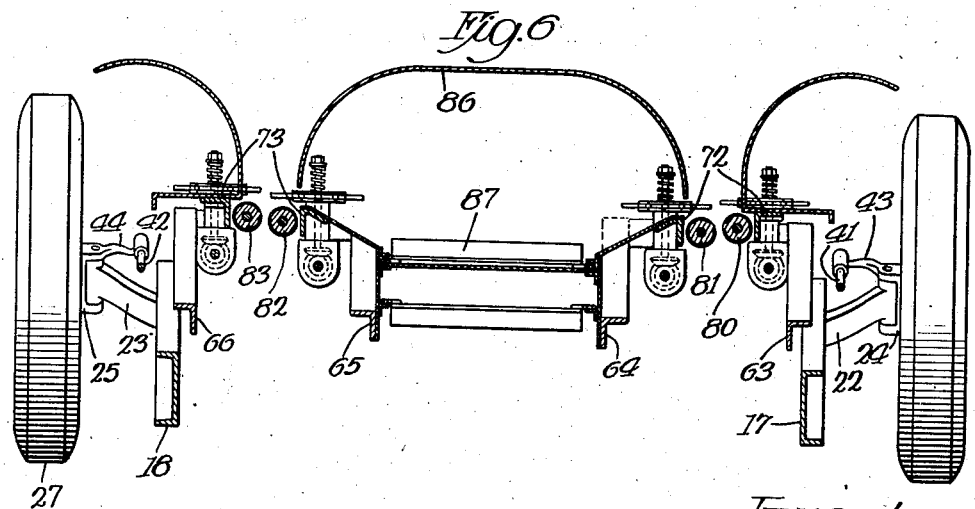
Fig. 6 is a detail transverse section through the picker mechanism looking forwardly.

The flexing of the frame joint is accomplished by means of a pair of toggle links 47, 48, which support the rear frame section, being pivotally united and attached, respectively, to the cross bar 19 and to the bracket 45, and controlled by a rock shaft 49 (Fig. 2) carried by the rearward frame section and having a crank arm 50 linked to a crank arm 51 projecting from the toggle link 47. The rock shaft 49 is controlled by a hand lever 52 (Fig. 2) which is anchored in its adjusted position by a latch cooperating with a notched quadrant 54. The load arm of the lever 52 is connected with the shaft 49 by a crank arm 53. By turning the shaft 49 the angular relation of the toggle links 47, 48, may be changed to elevate or lower the bracket 45. The control lever 52 may be located in any position on the shaft 49. As shown, it is within convenient reach of the driver's seat, but as the change in relative positions of the frame sections is not frequently required it may be otherwise positioned.

The power element of the machine is shown as a gas engine 55, of conventional type, and with its fuel tank is carried by a suitably supported frame extending backwardly from the rear frame section and located directly behind the driver's seat. The motor is provided with the essential connections for supplying fuel and for controlling the feed thereof. It is positioned near the driver's seat for convenience of control, and being located well back of the rear axle 12 serves as a counterbalance for the rear frame section and renders easy the adjustment thereof.

The power shaft 56 of the motor extends forward to a bearing 57, and is connected by a sprocket chain 58 with a shaft projecting forward from a gear box 59, from the rear side of which projects the propeller shaft which enters the differential gear casing 60, from which the wheel shafts of the rear axle are driven in the well known manner, as in automobile practice.

The beam 16 serves as a support for the frame carrying the picker mechanism. This frame, as shown, comprises a plurality of forwardly projecting bars, preferably of angle section, as 63, 64, 65 and 66; suitable uprights, as 67, 68, 69 and 70; and a cross bar 71 carried by and at the upper ends of the uprights. A pair of downwardly inclined angle bars 72, 73, extend forwardly from the upper portion of this frame and are attached to the forward ends of the frame bars 63, 66, for directly carrying the picker mechanism, which may be of any suitable construction. The mechanism shown is of known construction, and of itself comprises no novel features.

Briefly described, the picker mechanism shown comprises two pairs of forwardly projecting and downwardly inclined snapping rollers, as 80, 81, and 82, 83; suitable advancing chains and conveying mechanism associated therewith, and sets of driving gears, as 91, 92. This picker mechanism is provided with the usual sheet metal housing 86, slotted over the snapping rolls, the forward ends of the slots flaring and guiding any sprawling stalks.

An endless conveyor 87 receives the detached ears of corn from the two sets of rollers and transfers them to the boot of an elevator located adjacent the rear axle 12 and leading backwardly on the median line of the machine to deliver into a trailing receiving wagon which may be coupled to the machine at its rear end.

The picker and conveying mechanism is driven from a transverse shaft 88, carrying a pair of bevel gears 89, 90, and cooperating trains of gears, as 91, 92, associated with the picker mechanism.

The shaft 88 is driven from the power shaft 56 of the motor by a shaft 93, connected with the motor shaft by a pair of bevel gears 94, a sprocket chain 95, and connecting sprocket wheels 96, 97, mounted, respectively, on the shafts 93 and 88. The last-named shaft is sectional, the two sections being connected by clutch mechanism, conventionally represented at 98, and controlled by a hand lever 99 in convenient reach of the operator's seat. This seat is mounted on a side bar 100 of the frame of the machine, and the operator has within reach hand levers 101, controlling the motor clutch; lever 102, controlling the gears in the box 103; lever 104 controlling brake mechanism associated with the shaft 56; a clutch mechanism lever 99; as well as the frame control lever 52.

The box 59 may contain change speed gears, controlled by a suitable hand lever, as 102, thus providing for varying the traveling speed relatively to that of the picker mechanism to better adapt the machine to the crop about to be harvested.

The framing for supporting, and gear connection for driving, the picker mechanism will, of course, be varied to adapt it to the particular form of such mechanism which it may be desired to build into the machine. Such adaptation will, however, be well within the skill of the mechanic.

The operation of the machine will be readily understood from the foregoing description. It is pointed out that it has several desirable features, among them being compactness. It is illustrated as a two row machine, but obviously could be made of either smaller or larger size and capacity. In any case its compactness keeps it within the width of the zone operated on, and avoids damage to contiguous rows of corn. This economy of space is due not only to the compactness of the machine as a whole, its overall width being that of the picker mechanism, but in part to the central location and delivery of the conveyor and elevator.

Further, the picker mechanism is carried directly by the frame supporting the operating mechanism, bringing the steering wheels to the front end of the apparatus and simplifying the guiding of the machine.

The jointed frame provides for the ready control of the height of the picker mechanism, avoiding liability of injury to it due to unevenness of the ground. The compactness of the mechanism brings all of its parts within easy controlling reach of the operator.

The machine as disclosed has operated very satisfactorily in handling a large corn crop. Though the structure described is successful, the invention may be differently embodied within the scope of the appended claims. The usual husking mechanism associated with picker mechanism may be added, if desired.

I claim as my invention:

1. In a corn picker, in combination, a frame jointed for transverse vertical flexure, wheels for independently supporting each member of the frame, picker mechanism mounted on the rear section of the frame and projecting forward of the line of frame flexure, and means for vertically moving the forward end of such section.

2. In a corn picker, in combination, a frame jointed for transverse vertical flexure, means for independently supporting each member of the frame, picker mechanism mounted on the rear section of the frame and projecting forward of the joint thereof, and means mounted on the forward section for raising and lowering the forward end of the rear section.

3. In a corn picker, in combination, a wheel supported frame jointed for vertical flexure, the forward cross member of the frame being spaced a substantial distance from the front end thereof, each of the forward supporting wheels being mounted on one of the side members of the frame forward of such cross member, picker mechanism carried by the rearward member of the frame and projecting forwardly and downwardly between the forward wheels, and means for flexing the frame upwardly.

4. In a machine of the kind described, in combination, a transversely vertically flexible frame, the forward section thereof being torsionally flexible each section being independently wheel-supported, and picker mechanism carried by the rearward section and projecting forward of the frame joint.

5. In a machine of the kind described, in combination, a wheel-supported frame having side and cross beams, the forward cross beam being spaced a substantial distance from the forward ends of the side beams, and stub wheel axles at the forward ends of the last-named beams.

6. In a machine of the kind described, in combination, a wheel-supported frame having side and cross beams, the forward cross beam being spaced a substantial distance from the forward ends of the side beams, stub wheel axles at the forward ends of the last-named beams, laterally oscillatable steering spindles for the forward wheels attached to the stub axles, and steering gear for simultaneously moving the spindles in opposite directions.

7. In a machine of the kind described, in combination, a wheel-supported frame having side and cross beams, the forward cross beam being spaced a substantial distance from the forward ends of the side beams, stub wheel axles at the forward ends of the last-named beams, laterally oscillatable steering spindles for the forward wheels attached to the stub axles, steering gear comprising a rock shaft, oppositely projecting crank arms carried by the shaft and connected, respectively, to the spindles, and means for manually rocking the shaft.

8. In a corn picker, in combination, a transversely jointed wheel-supported sectional frame, the side members of the forward section thereof projecting a substantial distance beyond its forward cross member, stub axles for the forward wheels projecting laterally from the forward ends of the side frame members, picker mechanism carried by the rear frame section and extending forwardly therefrom and downwardly between the front ends of the side members of the forward frame section, a motor mounted on the rear frame section, and independently controlled means for connecting the motor with the rear supporting wheels and with the mechanism of the picker, and for flexing the frame to raise and lower the picker mechanism.

9. In a corn picker, in combination, a transversely jointed wheel-supported sectional frame, the side members of the forward section thereof projecting a substantial distance beyond its forward cross member, jointed stub axles for the forward wheels projecting laterally from the forward ends of the side frame members, picker mechanism carried by the rear frame section and extending forwardly therefrom and downwardly between the front ends of the side members of the forward frame section, a motor mounted on the rear frame section, independently controlled means for connecting the motor with the rear supporting wheels and with the mechanism of the picker, and for flexing the frame to raise and lower the picker mechanism, and steering gear for flexing the stub axles.

10. In a corn picker, in combination, a transversely jointed wheel-supported sectional frame, the side members of the frame section thereof projecting a substantial distance beyond its forward cross member, stub axles for the forward wheels projecting laterally from the forward ends of the side frame members, picker mechanism carried by the rear frame section and extending forwardly therefrom and downwardly between the front ends of the side members of the forward frame section, a motor mounted on the rear frame section, independently controlled means for connecting the motor with the rear supporting wheels, with the mechanism of the picker, and for flexing the frame to raise and lower the picker mechanism, and means for controlling the last named means.

11. In a corn picker, in combination, a four wheeled frame jointed transversely for vertical flexure, picker mechanism mounted on the rear section of the frame and projecting forwardly between the forward wheels of the frame, and means for flexing the frame.

12. In a corn picker, in combination, a supporting frame comprising front and rear sections jointed together for vertical flexure, a pair of wheels for supporting each section, means for flexing the frame upwardly, and corn picking mechanism carried by the rear frame section and projecting forwardly between the wheels of the forward frame section.

13. In a corn picker, in combination, a frame jointed for transverse vertical flexure, means for independently supporting each member of the frame, mechanism mounted on the rear end of the frame and projecting forward of the joint thereof and means mounted on the forward end for raising and lowering the forward end of the rear section, the forward section of the frame being torsionally flexible.

AUGUST OTTO.